June 18, 1968

3,389,109
METHOD FOR PREPARING AQUEOUS DISPERSIONS OF ETHYLENE COPOLYMERS
Thomas O. Harmon, Midland, James B. Louch, Coleman, and Donald S. Morehouse, Jr., Midland, Mich., assignors to The Dow Chemical Company, Midland, Mich., a corporation of Delaware
No Drawing. Filed July 26, 1965, Ser. No. 474,974
7 Claims. (Cl. 260—29.6)

This invention relates to a process for preparing stable, emulsifier-free aqueous dispersions of copolymers of ethylene and α,β-ethylenically unsaturated carboxylic acids.

It is known to the art that certain polymeric materials, such as polyethylene and copolymers of ethylene and α,β-ethylenically unsaturated carboxylic acids have found utility in a great many commercial applications. For example, copolymers of ethylene and acrylic acid have found wide utility as adhesives and coating materials.

One major hindrance to a more widespread industrial use of these copolymeric materials is that it is difficult to form emulsions or dispersions of them in aqueous media. In order to obtain such dispersions, it has been the practice in the art, e.g. U.S. Patents Nos. 2,313,144 and 2,496,907 to first dissolve the polymer in a water-immiscible or sparingly miscible solvent bath and upon dissolution of the polymer to add an aqueous solution containing an emulsfying agent to form dispersion. The water-immiscible solvent is then volatilized from the dispersion to provide an aqueous dispersion or "latex" of the polymer in the aqueous medium. This procedure may also be employed to prepare aqueous dispersions of copolymers containing ethylene and an α,β-ethylenically unsaturated carboxylic acid. However the emulsfying agent present in the final latex product is generally incompatible with the dispersed polymer and hinders the formation of coherent coatings as well as having a deleterious effect on the strength, toughness and water sensitivity of the dried film or coating.

In accordance with the present invention, stable, emulsifier-free aqueous dispersions of a copolymer comprised of ethylene and an α,β-ethylenically unsaturated carboxylic acid are prepared by a process which comprises dissolving the copolymer which is to be dispersed into an inert, organic, substantially water-miscible solvent having a boiling point, or which forms an azeotropic mixture with water having a boiling point, lower than 100° C., adding with agitation the copolymer solution to an aqueous liquid system containing an amount of an alkaline compound sufficient to neutralize at least 10 percent of the carboxylic acid units present in the copolymer with simultaneous distillation and removal of a major portion of the organic solvent as the solvent of copolymer is admixed with the aqueous system, leaving a dispersion of the copolymer in the aqueous system.

It is a critical feature of the process of the present invention that a water-miscible solvent be employed to dissolve the copolymer. If a water-immiscible solvent is used, large agglomerates of polymer form in the aqueous medium which ultimately coalesce into large intractable masses which render the latex unsuitable for any practical use.

It is also a critical and necessary feature of the process of the present invention that a major portion i.e. greater than 50 percent, of the organic solvent be removed, as by distillation, immediately upon contact of the copolymer solution with the aqueous system. If removal of a major portion of the solvent upon contact with the aqueous system is not accomplished the stability of the latex is adversely affected resulting in an undesirable amount of coagulum forming in the final latex product.

The relative proportions of copolymer, organic solvent, and aqueous material are selected so that the polymer dispersions so obtained are relatively concentrated, in the order of 10 to 30 percent by weight of the copolymer. If necessary or desired, the dispersion may be subjected to a further devolatilization to remove water and concentrate the polymer content, i.e. the solids content of the dispersion.

The ethylene copolymers employed in the process of the present invention are copolymers of ethylene with ethylenically unsaturated acids. The concentration of ethylene is at least 65 weight percent in the copolymer, and is preferably greater than 80 weight percent.

The ethylenically unsaturated acid component of the ethylene copolymer is an α,β-ethylenically unsaturated carboxylic acid group containing monomer having preferably from 3 to 8 carbon atoms. Examples of such monomers are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purposes of the present invention because of its chemical reactivity being that of an acid. Similarly, other α,β-monoethylenically unsaturated anhydrides of carboxylic acids can be employed.

The ethylene copolymers employed in preparing the dispersions of the present invention may be prepared in several ways. Thus, the copolymers may be obtained by the copolymerization of a mixture of ethylene and the carboxylic acid monomer. Methods employed for the preparation of ethylene polymers have been described in the literature. In a preferred process, a mixture of the two monomers is introduced into a polymerization environment maintained at high pressures, 50 to 3,000 atmospheres, and elevated temperatures, 150 to 300° C., together with a free radical polymerization initiator such as a peroxide. An inert solvent for the system such as water or benzene, may be employed, or the polymerization may be substantially a bulk polymerization.

The present invention, however, is not limited to copolymers obtained by direct copolymerization of ethylene with an α,β-ethylenically unsaturated carboxylic acid comonomer. The copolymers employed in the preparation of the dispersions may also be obtained by the grafting of the acid comonomer to a polyethylene base. Such graft copolymers are generally obtained by exposing a solution or finely divided powder of polyethylene to ionizing radiation in the presence of the carboxylic acid comonomer. In another method, polyethylene in solution or in a finely divided form is contacted with a solution of the acid and a peroxide. Graft copolymerization has been described in great detail in the literature and is for that reason not further detailed. Copolymers of ethylene with carboxylic acids may also be prepared by copolymerization of ethylene with an α,β-ethylenically unsaturated carboxylic acid derivative which subsequently or during copolymerization is reacted either completely or in part to form the free acid. Thus, hydrolysis, saponification or pyrolysis may be employed to form an acid copolymer from an ester copolymer. Carboxylic acid containing polymers obtained by the oxidation of polyethylene may also be used.

The ethylene copolymer employed in the process of the present invention need not necessarily consist of a two component polymer. Thus, although the ethylene content of the copolymer should be at least 65 weight percent, any other copolymerizable monomer can be employed in combination with the ethylene and the carboxylic acid comonomer. The additional copolymerizable monomer or monomers may be either a non-polar monomer such as propylene or styrene or a polar monomer such as ethyl acrylate or vinyl acetate.

The concentration of acidic monomer in the copolymers comprised of ethylene and an acid monomer, or ethylene, an acid monomer and a third non-polar monomer ranges from about 8 percent by weight to 35 percent by weight and, preferably, from about 10 to about 20 percent by weight. If acid concentrations less than about 8 percent are employed in these copolymers, an undesirable amount of coagulum tends to form in the final latex product. In copolymers comprised of ethylene, an acid monomer and a third polar monomer, the copolymer may contain as little as 5 percent of the acid monomer without an undesirable amount of coagulum forming in the final latex product.

The scope of base copolymers suitable for use in the present invention is illustrated by the following examples: Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/acrylic acid/ethyl acrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylenepropylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, polyethylene/acrylic acid graft copolymers, polyethylene/methacrylic acid graft copolymers, polymerized ethylene/propylene/acrylic acid graft copolymers, polymerized ethylene/butene-1/methacrylic acid graft copolymers and polymerized ethylene/vinyl acetate/methacrylic acid graft copolymers.

Suitable water miscible solvents having boiling points below water (i.e. below 100° C.) or which form azeotropic mixtures with water having boiling points below 100° C. which may be employed in the process of the present invention include alkanols, ethers and ketones having 1 to 4 carbon atoms particularly methanol, ethanol, n-propanol, iso-propanol and butanol, dioxane and tetrahydrofuran, acetone and methyl ethyl ketone, heterocyclic amines such as pyridine and the like.

Among the various alkaline compounds which may be employed as neutralizing reagents to prepare the colloidal dispersions of the present invention are the hydroxides of the alkali metals such as NaOH, LiOH, and KOH, concentrated ammonia, ammonium hydroxide, tetramethyl-ammonium hydroxide, monoalkyl amines such as ethylamine and propylamine, secondary and tertiary amines such as dimethylamine and trimethylamine, diethyl and triethyl amine and the like, monoalkanol amines such as ethanolamine and propanolamine, and polyalkanolamines such as di- and tri-ethanolamine, monocycloalkyl amines such as cyclohexylamine, and monocycloalkanol amines such as cyclohexanol amine. In addition, certain strong heterocyclic monoamines are also suitable for employment as neutralizing agents, such as morpholine and pyridine. However, KOH usually gives the best results in the simplest way and is, accordingly preferred.

In preparing the ethylene copolymer dispersions of the present invention the copolymer is first dissolved in a water miscible solvent at a concentration of about 2 to about 20 percent by weight. The solution is maintained at about 2° to 5° C. below its boiling point and then slowly added to an aqueous system containing an alkaline compound heated to a temperature of about 5° to about 10° C. above the boiling point of the copolymer solvent. The rate of addition of the copolymer solution to the aqueous system is adjusted so that the volume of solvent being distilled from the aqueous system is substantially equal to the volume of the solvent being added to the system.

The amount of alkaline compound employed when preparing the polymer dispersions by the process of the present invention need only be that which is necessary to effect dispersion. As the ratio of the acid component to the ethylene component or any other non-polar component in the copolymer is increased, less alkaline compound is required to effect a stable emulsion. This relationship holds true for copolymers containing a third polar monomer constituent, however a lesser amount of the alkaline compound is required as compared to an equivalent amount of a copolymer of the acid monomer and non-polar monomers.

Generally the amount of alkaline material required to effect a stable emulsion is in the range of about 0.10 to about 1.0 stoichiometric equivalents per carboxy group in the copolymer.

The ethylene copolymer dispersions prepared by the process of the present invention are white milky liquids containing up to about 30 percent by weight of the ethylene copolymer having particle sizes in the range of about 500 to about 3,000 A., and viscosities ranging from about 2 to about 16,000 centipoise (cps.).

Particle size and viscosity are generally dependent upon several factors, e.g. the amount of carboxylic acid in the copolymer, the degree of neutralization of the available acid groups, and the melt index of the copolymer.

In general, for ethylene/carboxylic acid copolymers the size of the particles in the final latex product will decrease inversely with the carboxylic acid monomer concentration and the degree of neutralization and in direct proportion to the melt index of the polymer.

The ethylene copolymer dispersion products, obtained in accordance with this invention, are useful for a number of purposes. For example, the dispersions are useful in the treatment and coating of solid or flexible base materials. Thus articles of wood, leather, paper, regenerated cellulose and its derivatives, glass, glass fabrics, natural and synthetic fibers may be suitably treated in this manner. The films and coatings prepared from the dispersions prepared by the process of the present invention exhibit excellent strength, toughness, coherency and water resistance.

The dispersions of the present invention can be modified by the inclusion of such materials as pigments, plasticizers, waxes, resins, agents to promote adhesion or facilitate stripping, metal powder and the like.

To illustrate the manner in which the invention may be carried out, the following examples are given. It is to be understood, however, that the examples are for the purpose of illustration and the invention is not to be regarded as limited to any of the specific materials or conditions recited therein.

Example 1

Twenty grams of an ethylene/acrylic acid copolymer having a melt index of 2.89 decig./min. (ASTM D–1238 57T) containing 14 mol percent acrylic acid was dissolved in 980 grams of tetrahydrofuran (THF) (B.P. 65° C.) heated to 60° C. The solution of copolymer was gradually added with stirring to 150 grams of deionized water containing 2.18 grams KOH (an amount of KOH stoichiometrically equal to the acid in the copolymer) heated to 65° C. The copolymer solution was added to the aqueous alkali solution at the rate of 20±5 cc./min., which rate of addition caused the volume of distillate being removed to be substantially equal to the volume of solution being added to the aqueous system.

After the complete addition of the copolymer solution, the resulting aqueous dispersion was heated to 100° C. to remove any remaining traces of THF. The resulting dispersion was found to contain 25 percent by weight solids, had a viscosity of 450 cps. and an average particle size of 1400 A.

Example 2

The procedure of Example 1 was repeated with the exception that ethylene/acrylic acid copolymers containing varying amounts of acrylic acid were employed. The details are summarized in Table I below.

TABLE I

| Test No. | Ethylene/Acrylic Acid Copolymer Composition (wt. percent) | | Melt Index | Concen. of Copolymer in THF (wt. percent) | Percent Neutralization of —COOH | Properties of Copolymer Dispersion | | |
|---|---|---|---|---|---|---|---|---|
| | Ethylene | Acrylic Acid | | | | Percent Solids | Viscosity (cps.) | Approximate Particle Size, A. |
| 1 | 92 | 8 | 2.2 | 5 | 100 | 10.9 | 830 | 1,000 |
| 2 | 90 | 10 | 2.8 | 5 | 100 | 12.2 | 1,060 | 800 |
| 3 | 87 | 13 | 2.0 | 5 | 100 | 14.8 | 60 | 2,000 |
| 4* | 86 | 14 | 2.6 | 5 | 100 | 10.0 | 1,200 | 800 |
| 5 | 86 | 14 | 2.6 | 15 | 100 | 20.0 | 100 | 1,800 |
| 6 | 82 | 18 | 8.2 | 5 | 100 | 14.8 | 16,000 | 3,000 |
| 7 | 75 | 25 | 8.1 | 5 | 50 | 10.5 | 9.5 | 1,000 |
| 8 | 75 | 25 | 8.1 | 5 | 12.5 | 9.0 | 4.0 | 1,500 |

*Pyridine employed as solvent.

Films were cast from the latexes prepared according to test numbers 1 through 8 inclusive of Table I by spreading the latexes on glass slides and allowing the latexes to dry at room temperature for 24 hours. After this time period, the slides were immersed in deionized water. The films were removed from the immersed slides within 10 minutes of immersion and were found to be clear and transparent.

By way of contrast, films prepared in the above manner from commercially obtained polyethylene latexes containing emulsifying agents whitened upon removal from the water indicating poor film formation.

Example 3

The procedure of Example 1 was repeated with the exception that an ethylene/ethyl acrylate/acrylic acid terpolymer was dispersed. The details are summarized in Table II below.

TABLE II

| Test No. | Ethylene Terpolymer Composition (wt. percent) | | | Melt Index | Concen. of Copolymer in THF (wt. percent) | Percent Neutralization of —COOH | Properties of Terpolymer Dispersion | | |
|---|---|---|---|---|---|---|---|---|---|
| | Ethylene | Acrylic Acid | Ethyl Acrylate | | | | Percent Solids | Viscosity (cps.) | Approximate Particle Size, A. |
| 9 | 84 | 8 | 8 | 2.2 | 5 | 100 | 17.0 | 4.0 | 1,100 |
| 10 | 72 | 14 | 14 | 16.4 | 10 | 100 | 20.0 | 50.0 | 2,000 |
| 11 | 69 | 6 | 25 | 23.0 | 10 | 100 | 20.0 | 114.0 | 800 |

Results similar to the foregoing may also be obtained when any of the other mentioned ethylene copolymers containing an $\alpha,\beta$-ethylenically unsaturated carboxylic acid are dispersed in accordance with the process of the present invention.

What is claimed is:

1. A process for preparing dispersions of ethylene copolymers which comprises dissolving a copolymer of monomers comprising at least 65 percent by weight ethylene and an $\alpha,\beta$-ethylenically unsaturated carboxylic acid having from 3 to 8 carbon atoms, the acid being present in amount of at least 8 percent by weight when only ethylene and acid are present in the copolymer and when any other monomer polymerized therein is a non-polar monomer, the acid being present in amount of at least 5 percent by weight when another polar monomer is polymerized in the copolymer, in a substantially water-miscible organic solvent which has a boiling point below 100° C. or forms an azeotropic mixture with water having a boiling point below 100° C., dispersing the polymer solution in an aqueous liquid system containing an amount of an alkaline compound sufficient to neutralize at least 10 percent of the carboxylic acid units present in the copolymer and simultaneously volatilizing a major portion of the solvent as the polymer solution is admixed with the aqueous system and thereby forming a dispersion of the polymer in the aqueous liquid system.

2. The process of claim 1 wherein the $\alpha,\beta$-ethylenically unsaturated carboxylic acid is acrylic acid.

3. The process of claim 1 wherein the polar monomer is ethyl acrylate.

4. The process of claim 1 wherein the organic solvent is tetrahydrofuran.

5. The process of claim 1 wherein the organic solvent is pyridine.

6. The process of claim 1 wherein the starting copolymer is one of monomers consisting essentially of ethylene and from 8 to 35 percent by weight acrylic acid and the organic solvent is tetrahydrofuran.

7. The process of claim 1 wherein the starting copolymer is one of monomers consisting essentailly of at least 65 percent by weight ethylene, at least 5 percent by weight acrylic acid, and up to 30 percent by weight of ethyl acrylate, and the organic solvent is tetrahydrofuran.

References Cited

UNITED STATES PATENTS 3,245,935 4/1966 Hargreaves et al. ____ 260—29.6
3,249,570 5/1966 Potts et al. _____ 260—29.6

MURRAY TILLMAN, *Primary Examiner.*

W. J. BRIGGS, *Assistant Examiner.*